2 Sheets—Sheet 1.

D. W. NORRIS.

Incased Glass-Vessel.

No. 8,658. Reissued April 8, 1879.

Attest,
W. H. H. Knight
Wm Blackstock.

Inventor,
D. W. Norris.
by L. Hill,
His Attorney.

N. PETERS, PHOTO-LITHOGRAPHER, WASHINGTON, D. C.

D. W. NORRIS.

Incased Glass-Vessel.

No. 8,658. Reissued April 8, 1879.

Attest.
W. H. H. Knight
Wm. Blacketock

Inventor,
D. W. Norris.
by L. Hill,
His Attorney.

N. PETERS, PHOTO-LITHOGRAPHER, WASHINGTON, D. C.

UNITED STATES PATENT OFFICE.

DANIEL W. NORRIS, OF ELGIN, ILLINOIS.

IMPROVEMENT IN INCASED GLASS VESSELS.

Specification forming part of Letters Patent No. 195,385, dated September 18, 1877; Reissue No. 8,324, dated July 9, 1878; Reissue No. 8,658, dated April 8, 1879; application filed March 6, 1879.

*To all whom it may concern:*

Be it known that I, DANIEL W. NORRIS, of Elgin, in the county of Kane and State of Illinois, have invented a new and Improved Incased Glass Vessel for Oils, Chemicals, &c.; and I do hereby declare the following to be a full, clear, and exact description of the same, reference being had to the accompanying drawings, forming part of this specification, in which—

Figure 1:
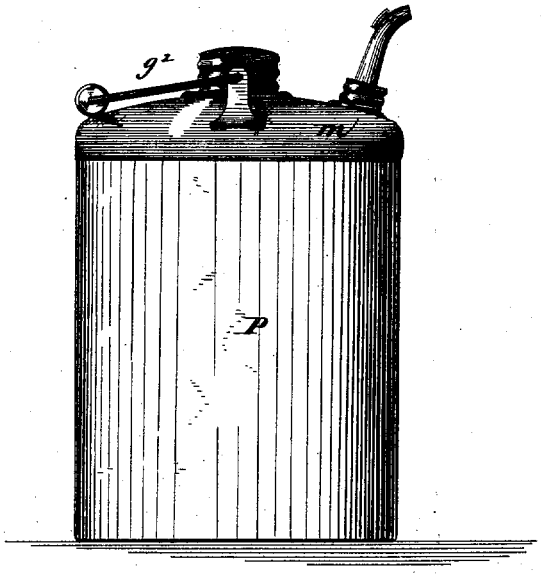
Figure 2:
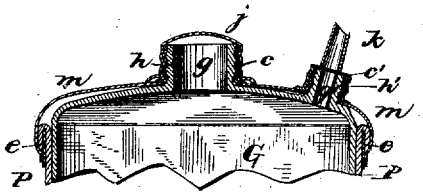
Figure 3:
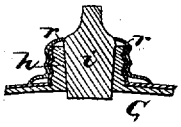

Figure 1 is a side view; Fig. 2, a vertical section of the upper part of the vessel; Fig. 3, a vertical section through the stopper; Figs. 4 to 8, inclusive, sections showing the application of the casing to the upper part of the vessel; and Figs. 9 to 13, inclusive, sections showing the application of the casing to the lower part of the vessel.

Similar letters of reference in the accompanying drawings denote the same parts.

This invention relates to improvements in incased glass demijohns, bottles, jars, cans, and other similar vessels of glass; and it consists in certain novel features, which will be hereinafter more fully specified, and pointed out particularly in the claims.

I have deemed it necessary to show in the drawings only one form of vessel with my improvements applied, since any skilled mechanic, having seen their application to this form, can readily apply them to other forms.

The vessel which I have selected for illustration is represented in Figs. 1 and 2, and consists of a glass can, G, provided with an orifice, *g*, for filling, and a discharge-orifice, $g^1$, and having a bail, $g^2$, attached to the casing by any suitable means. I incase the sides and top of the can with either paper or metal, *m*, or both, extending down under the edges of the bottom, so as to form a support, upon which the can rests, but leaving the central part of the bottom exposed for the purpose of enabling the contents to be readily seen by lifting the vessel. In some cases it may be best to incase the sides with paper and the top with metal, or vice versa, or to incase either sides or top, or both, with a casing of paper surrounded by an outer casing of metal; or both the sides and the top may be incased with either paper or metal alone. Several of these combinations are shown in Figs. 2 to 13, inclusive.

I prefer to construct the supporting metal rim under the can in such manner that it shall possess a certain degree of elasticity proportioned to the weight or fragility of the can, in order to save the latter from violent concussion when dropped upon an unyielding surface. Several modifications for this purpose are shown in Figs. 9 to 13, inclusive.

I do not limit myself to the details of construction shown in the drawings, but will proceed to describe them, in order to explain to mechanics skilled in the art some of the various modes in which the casing may be constructed and applied for practical use.

Figure 6:
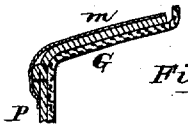
Figure 7:
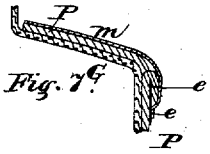

In Fig. 2 a paper or paper-board casing is applied to the sides of the vessel, and is combined with the sheet-metal casing applied to the top. The connection between the two is effected by having the upper edge of the paper turned down upon the sheet-metal hoop *e*, to which the lower edge of the top casing is fitted and soldered or otherwise fastened. Fig. 7 shows substantially the same construction, except that a pad of paper is applied between the glass and the sheet-metal casing. In Fig. 6 the same pad is applied under the sheet-metal top casing; but in connecting the sheet-metal top casing to the paper side casing the band or hoop *e* is omitted and the two casings are simply riveted together.

Figure 4:
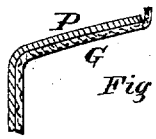
Figure 5:
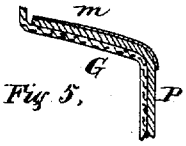

In Figs. 4 and 5 the paper side casing is molded or otherwise formed to fit also over the top of the can, so that the side and top casings are continuous; and in Fig. 5 an outer sheet-metal top casing is represented is applied over the paper casing.

Figure 8:
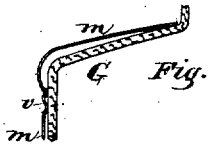
Figure 11:
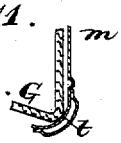
Figure 12:
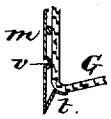
Figure 13:
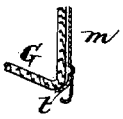

Figs. 8, 11, and 13 show a jacket or casing in which sheet metal alone is used. In Fig. 8 the sheet-metal top casing is represented as combined with the sheet-metal side casing, the two parts being united along their edges by any suitable means, and being held away from the glass by means of internal ribs or corrugations formed in the sheet metal, as represented at *v*; and Fig. 12 shows the sheet-metal side casing as held away from the glass by the interposition of some other material, and also shows the corrugations *v* for the same purpose as in Fig. 8, while in Figs. 2 and 8 the sheet-metal top casing is represented as formed in a shape to stand off at the shoulder and fit down closely around the neck of the glass can.

Figure 9:
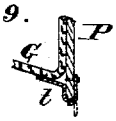
Figure 10:
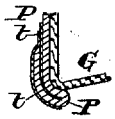

The bottom flange or tongue is represented by *t* in Figs. 9, 11, 12, and 13, and may consist of a supporting-lip turned in under the can, combined with a downwardly-projecting angle, as shown in Fig. 12, united by any suituable means with the lower edge of the side casing, or with an independent rim or band, as seen in Fig. 9. When the paper side casing is used the flange or tongue rests against the inner side of the paper, and is held in place by the independent rim or band, which is placed outside of the paper, extending below the same, and folding under both the paper side casing and the flange, to both of which it is attached by any suitable means, as seen in Fig. 9; or the paper may be doubled back at the bottom and a piece of metal be applied outside and riveted or otherwise secured to the paper casing, as shown in Fig. 10.

In both instances the outside bearing-surface is of metal, and the comparatively rigid metal is so combined with the more yielding paper that a sufficiently elastic support is provided for the can.

The same result can measurably be attained even if the lower edge of the paper or metal side casing extends down only to the connection shown in Fig. 9, and the supporting rim or band be formed to extend from that point downward below the edge of the glass can, and then be bent up into contact with the inner flange or tongue, so as to leave an open space immediately under the edge of the can, in which case the elasticity of the metal rim and flange alone will answer the purpose.

Thus most parts of the glass can, which would otherwise be exposed, are provided with an elastic or spring-buffer protecting-casing, and the liquid is prevented from working in between said can and the casing.

The filling-orifice *g* and discharge-orifice $g^1$ are formed in the glass necks *h h'*, and are made independent of each other, in order that either may answer as an air-vent while the other is employed for its legitimate purpose.

The outside of the glass neck *h* is covered with a closely-fitting sheet-metal covering or collar, *c*, which is packed or cemented to the glass neck to prevent any liquid from working under the casing, while the filling-orifice *g* in the neck *h* is covered by a removable sheet-metal cover or screw-cap, *j*.

The outside and top of the glass neck *h'* are covered with a sheet-metal covering, *c'*, secured to the glass neck by a screw-connection, and provided with a permanently-attached projecting tube or spout, *k*.

The coverings *c c'* serve to lock the top casing down to the glass can, and thus assist in supporting the vessel when raised by the bail, thereby to that extent relieving the side casing from undue strain.

When the vessel is to contain acids or other corrosive or volatile liquids a ground-glass stopper may be applied, as represented at *i*, Fig. 3, and may be held securely in place by an outside ring of metal, *c*, screwing down over the glass collar, and provided with a retaining-flange at its upper edge, which locks over the shoulder of the glass stopper and prevents the latter from working out.

Some of the advantages of this mode of incasing glass vessels are that it adds only slightly to the weight and size of the vessel, is inexpensive, is neat in appearance, and perfectly incases and protects the vessel at all essential points, so as to prevent injury from contact with other objects, and obviates the leakage common to vessels in which the same orifice is used for both filling and pouring, and renders the vessel more convenient to pour from, as it can be emptied by tipping it but little more than one-half over, while it does not prevent the condition of the interior or of the contents from being inspected at pleasure.

The mode of constructing the casing so as to incase the sides and top, but leave the bottom exposed, is of great value when the vessel is to contain substances that are chemically affected by light, inasmuch as it protects the vessel from the access of the light-rays, and yet does not hinder the free inspection of its contents, the only space that is capable of transmitting light being closed by setting the vessel on its bottom, and exposed by raising it therefrom for the purpose of examining its contents.

Having thus described my invention, what I claim as new is—

1. An incased glass vessel for containing and transporting liquids, having an elastic metallic rim extending under the edges of the bottom, for the purpose of furnishing a support for the vessel without excluding light through the bottom when the incased vessel is raised, substantially as described.

2. The combination of a glass vessel, paper side case, and metal top covering, substantially as described.

3. In an incased glass vessel, the combination of the lifting bail or handle and the inclosing-case with the vessel having a screw-neck and a cap or ring screwing or otherwise secured around said screw-neck, and lapping over the top casing, whereby in lifting the vessel the whole or a portion of the weight is supported by the screw-neck, substantially as described.

4. An incased glass vessel provided with one or more glass supply and discharge necks, having external metal coverings screwing or otherwise secured around said neck or necks, and attached to the top casing, in combination with a lifting bail or handle, whereby in carrying the vessel the whole or a portion of the weight is supported by the glass neck or necks, substantially as described.

5. An incased glass vessel having a glass discharge-neck, a metallic collar permanently attached to the periphery of said neck and also to the casing, and having a pouring-spout permanently attached to said peripheral collar, substantially as described.

6. A glass vessel having near one side of its top a tapering metal pouring-tube projecting upwardly and inclined outwardly, said metal tube being affixed to the glass top of the vessel by a cemented screw-connection, substantially as described.

7. A glass vessel having on one side of its top a projecting, tapering, and outwardly-inclined metal pouring-tube, affixed by a cemented screw-connection to the glass top of the vessel, and having at another place on its said top an independent filling-orifice, closed and opened by a metal screw-cap, which screws upon a metal surface permanently attached to the glass top of the vessel, substantially as described.

DANIEL W. NORRIS.

Witnesses:
M. CHURCH,
D. P. COWL.